Sept. 24, 1957 A. LESTI 2,807,715

DECODER FOR PULSE CODE MODULATION SYSTEMS

Filed Oct. 27, 1950

INVENTOR
ARNOLD LESTI
BY [signature]
ATTORNEY

United States Patent Office 2,807,715

Patented Sept. 24, 1957

2,807,715

DECODER FOR PULSE CODE MODULATION SYSTEMS

Arnold Lesti, Nutley, N. J., assignor to International Telephone and Telegraph Corporation, a corporation of Maryland Application October 27, 1950, Serial No. 192,443

4 Claims. (Cl. 250—27)

Figure 1:
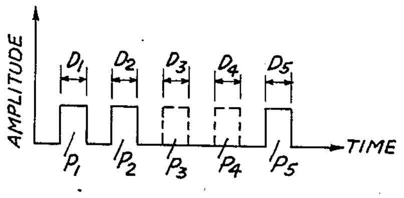

This invention relates to a decoder for pulse code modulation systems.

Pulse code modulation systems have been described which provide a series of pulse positions, successive in time, the presence or absence of pulses in said positions being arranged according to a code to represent the instantaneous value of a signal wave. This instantaneous value may be a "quantized" value, or the original signal wave may have been compressed, expanded, limited or distorted in some other fashion depending upon the communication requirements. At a receiver a succession of such series of pulses is translated into a wave similar to the original signal wave. In most of these systems each position has a given, usually different, weight or value when a pulse is present and zero or a fixed minimum value when the pulse is absent. In other codes this is reversed, the weight being zero or a fixed minimum value when a pulse is present, and a given substantial value when the pulse is absent, differing for different pulse positions. The weights of the pulses (or the empty pulse positions) forming a given series are algebraically added to produce a voltage or current whose amplitude is proportional to the amplitude of the original signal wave at a corresponding moment.

One of the most common codes of this type is known as the standard binary code in which each succeeding position has twice or one half the value of the immediately preceding position. Thus for example if the first pulse position represents a value of $n$ units the second position would represent a value of $2n$, the third position $4n$, the fourth position $8n$, the fifth position $16n$, etc. The weighting order may be reversed and if the first pulse position has a value $n$, the succeeding pulse positions would have the following values respectively; $n/2$, $n/4$, $n/8$, $n/16$ etc.

Codes of the above type which are hereinafter referred to as weighted pulse binary codes have been widely described in the literature of this art, and various forms of decoders for translating the coded pulses to reconstruct the original signal wave have been proposed. In general these decoders have had various difficulties, such as complexity, lack of reliability, inability to handle multichannel trains wherein the succeeding series of pulses belong to different channels, etc. Many of these decoders depend for their operation on electronic devices whose transfer characteristics frequently change and produce erratic operation.

An object of the present invention is to provide a decoder for weighted binary code pulse modulation systems which is simple in construction, reliable in operation and whose characteristics are stable.

In accordance with a major aspect of the present invention the pulses to be decoded are applied to transmission network such as a tapped delay line which is suitably terminated to prevent reflections. These taps are so located that at a given instant each pulse of the series will simultaneously appear at a corresponding separate one of said taps. These taps are each connected in series with a resistor each having a different suitably selected value. The purpose of these resistors is to attenuate the amplitude of each pulse in accordance with the value of its pulse position. Thus for example if the first pulse is to have a weight of $n$, as explained hereinabove, the total attenuation of that pulse due to its resistor and due to the attenuation of the pulse as it travels along the delay line will be such as to give an output proportional to $n$, as for example $kn$. The second pulse is to be given a weighted value of $2kn$ and the succeeding pulses $4kn$, $8kn$, $16kn$ etc. This is done by suitably selecting the value of these resistors. The outputs of each of the resistors is then combined to produce a voltage corresponding to the instantaneous voltage of the original signal wave at a corresponding moment. In order that the voltages may be taken off at the instant at which the pulses have all reached the position of their corresponding tapping point on the delay line, the outputs of all the resistances are fed to a combining device which only operates at those instants at which the pulses have arrived are at their proper positions. The output of this combining device may be integrated to produce a wave representing the original signal wave.

Figure 2:
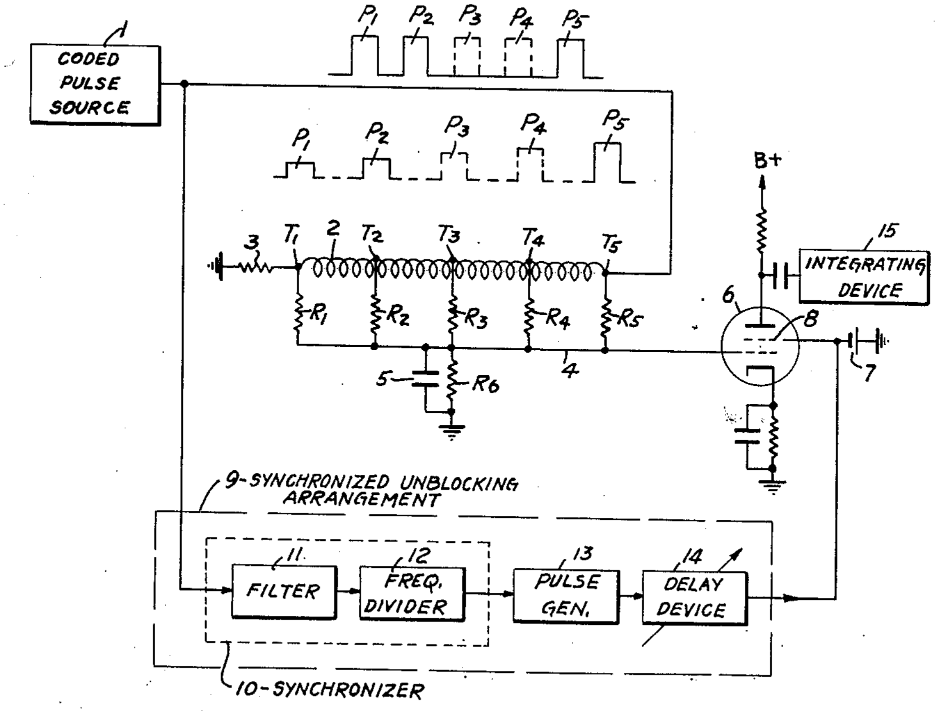

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic representation of a single series of weighted binary code pulses which is used in describing the operation of one embodiment of the present invention and, Fig. 2 is a schematic and blocked diagram of one embodiment of the present invention.

Referring now to Fig. 1 the series of code pulses there represented is provided with 5 successive time positions D1, D2, D3, D4 and D5 in which a pulse may or may not appear according to the instantaneous value which this series is to represent. Thus in these 5 time positions there is room for 5 pulses, P1 through P5, P3 and P4 being indicated in dotted lines in the particular example herein described to show that no pulse is present in these positions. Each pulse has a different weight which weight may be referred to zero or above a given fixed minimum. In the weighting which is to be used here solely as an example P1 is given a weight of $n$ units, P2=$2n$, P3=$4n$, P4=$8n$, and P5=$16n$. Assuming that $n$ represents one volt and in the absence of a pulse no weight is given to the pulse position, the total weight of the series of pulses indicated in Fig. 1 is arrived at as follows:

P1=1 volt;
P2=2 volts;
P3 and P4 are not present and their weight is therefore equal to zero volts; and
P5=16 volts; totalling 19 volts as the amplitude repeated by the pulse series indicated in Fig. 1.

Of course it is to be recognized that the weighting of the pulse positions might be reversed with pulse P1 having the greatest weight and others having successively lesser weights, or that the weighting might be scrambled with respect to successive pulses. Likewise it is to be noted that instead of the pulses being given weights, the spaces between pulses or the absence of pulses may be given weights and the presence of pulses used to indicate zero or a constant fixed value. In addition there are codes like those known by the term "cyclic permutation codes" in which the weights are not only added but also subtracted. See U. S. application No. 3230/48, filed January 20, 1948, for Aigrain 2. The present invention is, as will be evident from the following, adapted to decode all the different codes mentioned above as well as numerous others.

While in pulse code modulation transmission the amplitude of the pulses is not significant provided the amplitude is sufficient to distinguish over the noise level. In the decoder herein described it is desirable that all the pulses be of constant amplitude and provision may be made, for example in the receiver, to ensure this. The pulses, or more exactly, the pulse positions have a constant repetition rate, that is, the period between the center of one pulse position and the center of the succeeding pulse position is a constant. Furthermore each series of code pulses representing a single instantaneous amplitude of the original signal wave follows the preceding series by a constant period so that stated another way, the series repetition rate is also a constant. The pulse repetition rate and the series repetition rate are harmonically related. Use is made of both the pulse repetition rate and the series repetition rate in decoding the pulses as will be clearly seen from the following description of the embodiment illustrated in Fig. 2.

Referring now to Fig. 2 successive series of constant amplitude weight code pulses of the type hereinabove described, such as for example in connection with Fig. 1, are provided by a source 1. One of said series consists of pulses P1—P5, where pulse P3 and P4 are absent. These pulses are applied to a tapped delay line or network 2 terminated in a suitable impedance 3 to prevent reflections. Taps T1, T2, T3, T4, T5 are provided which are spaced apart a distance corresponding to the period between the centers of successive pulse positions. Thus in the example illustrated when pulse P1 arrives at tap T1, pulses P2 through P5 will appear at taps T2 through T5 respectively. A plurality of attenuating resistors R1 through R5 each have one end connected to a separate one of the taps T1 through T5 respectively, the other end of said resistors being connected together by a common line 4 which in turn is connected in series with a common resistor R6 to ground. Resistor 6 may be shunted by a high frequency by-pass condenser 5.

The resistors R1 through R5 have given values, these values being selected so that the voltage produced across R6 due to each of the pulses appearing at its corresponding tap will be proportional to the weight of the pulse according to its position in the series. A simple example will make this clear. Assuming that the pulses have each arrived at the tap corresponding to their position in the the series, P1 will produce a current flow through R6 which should produce a voltage drop across R6 equal to $n$. P2 will add to this a voltage equal to $2n$. P3 and P4 would if present add to the foregoing voltages equal to $4n$ and $8n$ respectively, but since they are absent in the example illustrated they do not contribute any additional voltage across R6. P5 introduces an additional voltage across R6 equivalent to $16n$. Thus there appears in the example discussed a voltage caross R6 equal to $19n$ volts. It will be immediately apparent that the pulses applied to the delay line from source 1 must each have an amplitude greater than $16n$ volts in the example illustrated. Likewise it will be apparent that resistor R1 will be greater than R2, R2 greater than R3 etc. However, one additional factor must be considered and that is that as the pulses pass along the delay line 2 they will be progressively more and more attenuated, this being represented by the different amplitude of pulses P1 through P5 as they appear at their tapping points. This attenuation must be considered in proportioning the value of resistors R1 through R5 it being quite evident that the attenuation of the last pulse of the series, P5 due to the delay line is slight or zero whereas the attenuation of the first pulse, P1 which is passed substantially along the entire length of the delay line is of substantial magnitude.

It will be recognized that the pulses of the series will appear at their corresponding tapping points at a given time and that at other times the voltage across R6 will not correspond to the code signal amplitude represented by the series of code pulses. Means are therefore provided to produce an output from the decoders delay line and attenuating arrangement only at these instants when the pulses are in their proper positions. For this purpose a suitable gating arrangement may be provided and may include an electron discharge device or tube 6 to whose grid voltages developed across R6 are applied. This tube is normally blocked by a biassing potential, for example from a source 7, and is periodically unblocked by a positive voltage likewise applied, for example, to another grid 8 of tube 6 from a synchronized unblocking arrangement 9 and which may take any of several forms.

One form of such arrangement includes a synchronizer 10 including a filter 11 tuned to the pulse repetition rate or a harmonic thereof and to which the pulses from source 1 are applied. The output of this filter is applied to a frequency divider 12 which produces an output wave having a frequency equal to the pulse series repetition rate (mentioned above) or a wave harmonically related thereto. This wave is then applied to a synchronized pulse generator 13 which produces unblocking pulses at the series repetition rate. These pulses are then applied through a variable delay device 14 to the grid 8 of tube 6 to unblock said tube. The delay device is adjusted so that the tube is unblocked periodically whenever the coded pulses of each series have passed along the delay line and arrived at their corresponding tapped points.

The output of tube 6 may be applied to a suitable integrating device 15 to reproduce the original wave.

The original wave may have been a "quantized" wave or a compressed or expanded wave or a wave distorted in some particular manner. Correction for some of these effects may be made in the selection of the values of resistors R1 through R5. For example if the original wave was compressed, expansion can be produced by suitably allowing for this compression in the values of resistors R1 through R5. In this process of expansion it will be apparent for example that the attenuation produced by resistor R5 would reduce pulse P5 not to a value equal to $16n$ volts but to a value greater than $16n$ volts, as it appears across resistor R6. Pulse P5 may, for example, be given a value of $24n$ and pulse P4 be given a value of $10n$ instead of the values of $16n$ and $8n$ respectively. Compression of a pulse code signal may likewise be accomplished and various other distortions may be corrected by suitable choice of the values of resistors R1 through R5.

While I have decribed 5 pulse positions obviously the system is capable of handling a much larger number of such positions. In systems where the absence of a pulse is used to indicate a given weight and the presence of a pulse represents zero weight (or zero weight above a given minimum), it is relatively simple to produce an inversion so that pulses appear in the pulse train where the spaces were and spaces appear where the pulses were and thus the decoder here described may be readily employed for such types of code.

Furthermore the basic principle of this decoder may be used for codes where the weight of one pulse is subtracted from the weight of another pulse to produce the final total weight of the series, as in the cyclic permutation code hereinabove referred to. For this type of code instead of the voltages being all applied in the same direction to a common resistor R6, separate resistors may for example be provided for each of the taps and the output of these resistors combined in opposition in accordance with the code arrangement, by applying these outputs with opposite polarities to a common voltage combining resistor.

The combining of the voltages and the production of their effective weightings across resistors instead of with the use of electronic tubes is highly desirable since resistors can be made of highly stable characteristics whereas tube characteristics vary too much for reliable steady use in such arrangements.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A decoder for pulse code signals having a succession of series of successive pulse positions each having a different given weight in the presence of a pulse, the algebraic sum of the pulse weights of each such series representing instantaneous values of the original signal wave at successive moments; comprising a source of such coded signal pulses, a transmission network having a series of points therealong corresponding to each of the time positions of said series of pulses, means for producing a voltage at each of said points in response to the presence of one of the pulses of said series, the voltage produced at each said point being proportional to the time position said point represents in said pulse series, means to combine the voltages produced at said points, a normally blocked gating device, and means responsive to said pulse series to unblock said device when the pulses of one of said series have arrived at said series of points of said network corresponding to their position in said pulse series, said means for unblocking said gating device including means responsive to the repetition rate of said pulse series to produce a synchronizing pulse and means to apply said synchronizing pulse to said device as an unblocking voltage.

2. A decoder for pulse code signals having a given series of pulse positions, comprising a delay line having a series of tap points corresponding in number and time relation to the pulse positions of said given series, a normally blocked gating device, combining means coupling said tap points to said gating device, synchronizing means responsive to said code signals to control said gating device for unblocking operation in coincidence with arrival of the pulses of a code signal at the tap points corresponding to the pulse positions thereof in said given series, and means to apply said pulse code signals to said delay line, said synchronizing means including means tuned to the repetition rate of successive pulse positions of said given series and means responsive to the wave energy of said tuned means to produce an unblocking pulse for application to said gating device.

3. A decoder according to claim 2, wherein the means responsive to wave energy includes a frequency divider, a pulse generator, and a variable delay device, said frequency divider producing an energy wave whose frequency is related to the said pulse positions and applied to said pulse generator which produces said unblocking pulse for application to said gating device through said variable delay device.

4. A decoder for pulse code signals having a succession of series of successive pulse positions each having a different given weight in the presence of a pulse, the algebraic sum of the pulse weights of each such series representing instantaneous values of the original signal wave at successive moments; comprising a source of such coded signal pulses, a delay line tapped at successive points, each corresponding to a separate one of each of said pulse positions, a plurality of resistors each coupled to one of said tapped points, each of said resistors having a different value, means for applying the pulse code signals to one end of said delay device, means combining the output of each of said resistors, a normally blocked gating device to which said combined output is applied, means for unblocking said gating device when the pulses of each one of said series have arrived at the tapped points of said delay device which correspond to their position in their pulse series, said gating device comprising an electron tube, and means for applying a blocking voltage bias to said tube; said unblocking means comprising a filter tuned to the repetition rate of the successive pulse positions, means for applying the pulses from said source to said filter, a frequency divider for dividing the output wave of said filter to produce a wave having a repetition rate harmonically related to the repetition rate of the pulse series, a pulse generator, means for applying the wave from said frequency divider to synchronize said pulse generator, an adjustable delay device coupled to said pulse generator to control the phase of the pulses produced thereby, and means for applying the pulses from said adjustable delay device to said electron tube to unblock said tube.

References Cited in the file of this patent

UNITED STATES PATENTS

| | | |
|---|---|---|
| 2,227,052 | White | Dec. 31, 1940 |
| 2,408,079 | Labin | Sept. 24, 1946 |
| 2,522,609 | Gloess | Sept. 19, 1950 |
| 2,641,698 | Gloess et al. | June 9, 1953 |

FOREIGN PATENTS

| | | |
|---|---|---|
| 658,479 | Great Britain | Oct. 10, 1951 |